United States Patent Office 3,268,443
Patented August 23, 1966

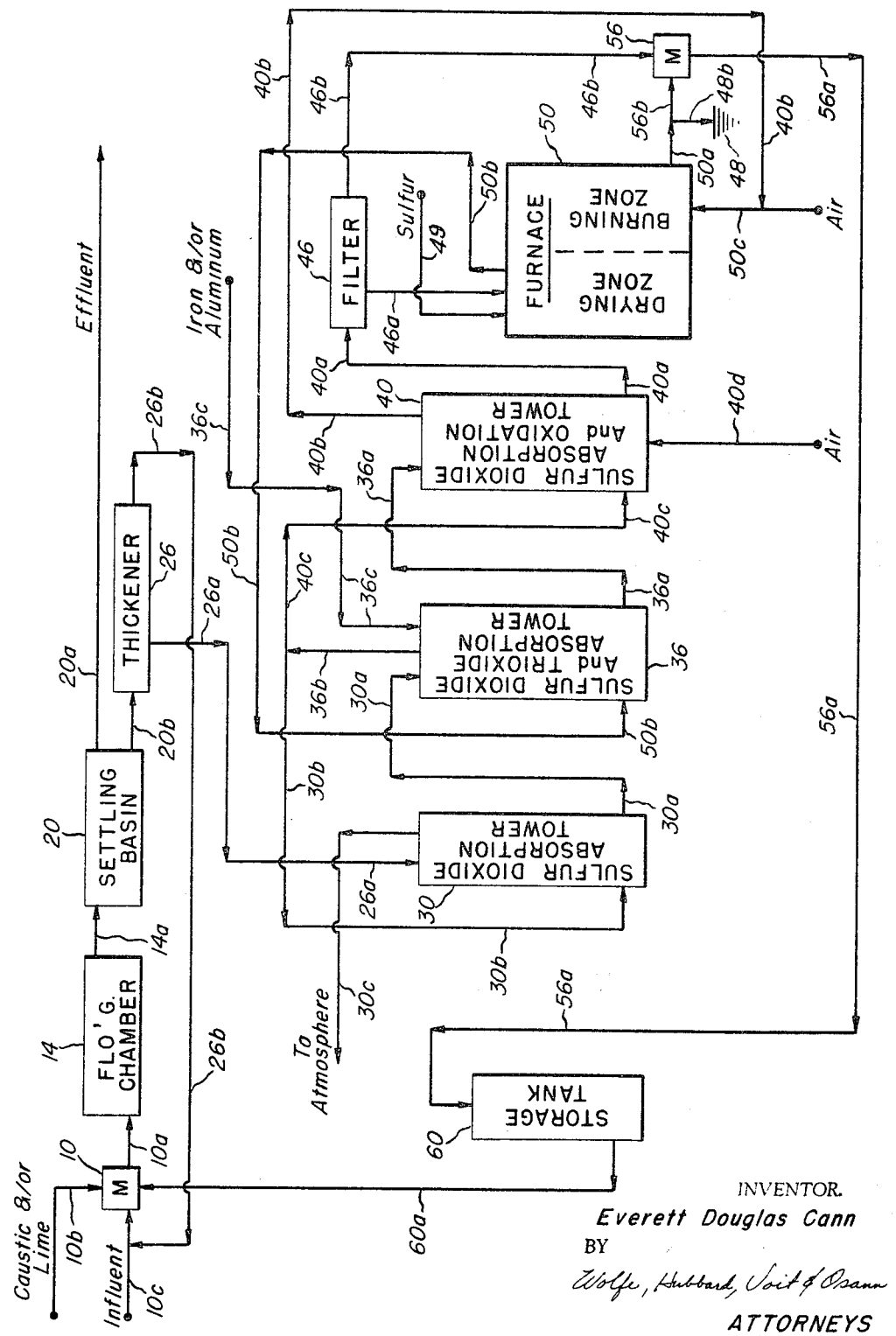

3,268,443
PROCESS FOR THE TREATMENT OF WASTE LIQUORS WITH FLOCCULATING AGENT RECOVERY
Everett D. Cann, 847 W. Jefferson Drive, Freeport, Ill.
Filed May 5, 1965, Ser. No. 453,351
8 Claims. (Cl. 210—47)

This is a continuation-in-part of my earlier application Serial No. 270,917, filed April 5, 1963, now abandoned.

This invention relates to the treatment of industrial and domestic waste liquors, particularly those containing suspended waste solids. The invention specifically concerns the recovery of chemical flocculating agents used in the treatment of such waste liquors, and to improved waste liquor treatment processes resulting from such recovery.

Efficient sewage disposal is important to the health of any community. Industrial and domestic wastes, generally in the form of water containing varying amounts of suspended and dissolved organic and inorganic solids, must be treated to condition the water before it is released to rivers or lakes.

A common treatment of waste liquors containing suspended solids is to coagulate the solids by introducing a flocculating agent such as alum (aluminum sulfate) or iron sulfate, which hydrolyzes under alkaline or neutral conditions to form a sticky floc. This floc combines with the suspended waste solids and accelerates the gravity settling of the solids. In addition, flocculating agents coalesce any colloidally suspended waste solids which would otherwise be immune to gravity settling. As a result, a typical settling time of two to three hours without a flocculating agent may be shortened to about thirty minutes or so by using a flocculating agent and, moreover, more complete solids removal is accomplished. In terms of practical operating performance, flocculating chemicals can either reduce the size of settling basins or chambers or can materially increase the throughput of existing basins—often by a factor of from four to six times. Indeed, many communities have, by using flocculating agents, been able to accommodate much larger sewage loads without additional capital investment, and at the same time have improved the quality of their treated effluent. However the advantages of flocculating agents are not without concurrent difficulties. Chief among these is the cost of alum or ferric sulfate, the flocculating agents of choice. It is, accordingly, a primary object of the present invention to provide an improved method of recovering and recycling the flocculating agent, which thereby permits more of the agent to be used so as to provide improved operation of the waste liquor treatment process.

Briefly, and in accordance with the invention, I provide an efficient method of recovering the flocculating agent from the flocculant concentrate of agent (in its hydroxide form) and waste solids so as to permit the solids to be disposed of and the flocculating agent to be recycled. This is accomplished by contacting the concentrate of flocculating agent and originally suspended solids with sulfur oxide gases to convert the hydroxide of the flocculating agent to the sulfate, sulfite, and/or bisulfite, and by providing sufficient oxygen gas to convert the sulfites and bisulfites to sulfates. The sulfate forms of iron and aluminum are soluble, so that the iron or aluminum sulfate may be extracted from the concentrate and recycled to the waste liquor treatment process.

According to the perferred form of the invention, sulfur oxides are produced by controlled combustion of elemental sulfur, and the flocculant concentrate of flocculating agent and waste solids is contacted with the sulfur oxides in several gas-liquid absorption towers. In the first tower the gas is chiefly sulfur dioxide; in the second it is mainly sulfur dioxide and trioxide, and in the third it is mainly sulfur dioxide and air (oxygen). Waste gases, substantially denuded of sulfur oxides, may be discharged to the atmosphere from the first tower. By the foregoing multi-tower procedure efficient utilization is made of substantially all of the sulfur dioxide and sulfur trioxide produced by burning elemental sulfur.

The invention in its various aspects will be more apparent in the ensuing description thereof, which is to be read in conjunction with the attached single figure showing a preferred embodiment of the invention.

A conventional sewage treatment plant consists of one or more stages utilizing various methods and apparatus. Speaking generally, the first stage, which itself may be composed of several sub-stages, is adapted to remove most of the settleable solid wastes. These are composed of both organic and inorganic constituents, with the composition being largely dependent on the nature of the industrial contaminant sources. The second stage is commonly an aerobic digestion treatment where, with the aid of aerobic bacteria, much of the remaining suspended waste materials is destroyed. A third stage is frequently included, and this ordinarily consists of an apparatus which simultaneously filters and oxidizes the waste liquor stream to reduce its biological oxygen demand (B.O.D.). A trickling filter is usually used for this third stage. A general review of sewage and industrial waste-water treatment processes is included in Shreve, "Chemical Process Industries," pp. 59–62 (1945), and in the references cited therein.

The flocculating agents are ordinarily used in the first or primary stage but may be included with advantage in the second stage. These agents, as earlier stated, are chiefly ferric sulfate or aluminum sulfate which, under sufficiently alkaline conditions, hydrolyze to form a sticky floc that agglomerates suspended solid waste particles. It is generally advisable to introduce an alkaline material such as caustic soda or lime to provide a pH above about 7, the optimum pH being correlated in known manner with the nature of the flocculating agent, the amount of agent, the concentration of suspended solids, and the degree of clarification desired in order to provide maximum clarification. Thus far the procedures described are more or less conventional, and are used in the vast majority of waste liquor treatment processes.

Turning to the drawing, an illustrative procedure for the treatment of a mixed industrial and domestic waste liquor is schematically depicted. It is assumed that, on the average, the daily influent is ten million gallons, and this influent contains 48 ml. per liter of settleable solids (as determined with an Imhoff cone) or, as otherwise determined, about 170 ml. per liter of suspended solids. It has a B.O.D. of about 190.

The influent or incoming waste liquors enter the waste liquor treatment process via line 10c and are conducted to rotary impeller mixer 10 of conventional design. Here aluminum sulfate is metered in via line 60a to supply 300 p.p.m. of aluminum sulfate, and lime is introduced via line 10b to adjust the pH to about 6.0.

The resulting mixture is passed via line 10a to a flocculating chamber or vessel 14 of conventional design so as to provide sufficient opportunity for the aluminum sulfate to hydrolyze and form aluminum hydroxide.

The stream from flocculating chamber 14 then passes via line 14a to settling basin or vessel 20, where the stream remains for an average residence time of from about ten to about sixty minutes, for example about thirty minutes. The clarified liquor or effluent is withdrawn from settling basin 20 via line 20a at a rate of about 9.8 million gallons per day, and may be conducted to second and/or third stage waste liquor treatment steps, as outlined earlier. This effluent contains about 0.05 ml. per liter of settleable solids and 30 ml. per liter of suspended solids; it has a B.O.D. of about 60.

The bottoms stream from settling basin 20 is withdrawn at a rate of about 200,000 gallons per day via line 20b. This has a total solids content of about 12 percent, which is composed of a flocculant concentrate of the hydroxide of the flocculating agent, specifically aluminum hydroxide, together with occluded organic and inorganic waste solids. This stream is conducted to thickener 26, advantageously a Dorr-Oliver cyclonic separator, where a further concentrated stream is withdrawn as a bottoms via line 26a, while the overhead is pumped via line 26b back to the influent conduit 10c. The thickened bottoms material from thickener 26 contains about 25 volume percent solids, and is pumped through line 26a to the top of sulfur dioxide absorption tower 30.

Sulfur dioxide absorption tower 30 is one of a sequence of three gas-liquid absorption towers 30, 36, and 40, each provided with plates, trays, or packing material to facilitate intimate contact between a descending stream of liquid and an ascending stream of or containing an absorbable gas. Inasmuch as the liquid streams here under consideration contain substantial amounts of solids, the three absorption towers are designed in known manner to avoid or minimize fouling of the tower internals with solid materials.

Liquid entering sulfur dioxide absorption tower 30 via line 26a progresses serially down through the sulfur dioxide absorption tower 30, then via line 30a to the top of sulfur dioxide and trioxide absorption tower 36, through which it descends; then via line 36a to the top of sulfur dioxide absorption and oxidation tower 40, from whence it is withdrawn via line 40a near the bottom of tower 40. Gas-liquid contact in each of towers 30, 36, and 40 is countercurrent.

Diverting momentarily from the flow of liquid, sulfur dioxide and sulfur trioxide gas is produced in furnace 50 by burning molten elemental sulfur, supplied via line 49, with air (supplied through line 50c) and with recycle oxygen-containing gases admitted via line 40b. Furnace 50 also serves other functions, particularly the drying of filtered waste solids, but a discussion of these may be deferred temporarily. The furnace 50 is advantageously a rotary sulfur burner in which molten sulfur is transferred from a hopper to a pool maintained in the bottom of a slowly rotating horizontal cylinder through which air and recycle oxygen-containing gas are passed. Alternatively, atomizing jets may be used to distribute the molten sulfur in furnace 50. (See "Notes on Industrial Chemistry," pp. 2–31 M.I.T., October 1938.)

Oxidation of sulfur in furnace 50 produces a gas stream withdrawn via line 50b that is composed of nitrogen, sulfur dioxide, sulfur trioxide, unconsumed oxygen, some carbon oxides, and traces of various other gases. The operation of furnace 50 is advantageously controlled by utilizing a substantial amount of excess air (oxygen) so as to maximize the conversion of sulfur to sulfur trioxide rather than to sulfur dioxide. Ordinarily the combustion of sulfur with air, in the absence of any catalytically active material, produces a gas in which from about 2 to about 10 percent of the sulfur is in the form of the trioxide, but by utilizing a somewhat higher percent excess oxygen than is normal, that is, to provide about 1–5 volume percent oxygen in line 50b, conversion to sulfur trioxide may be maximized.

The gaseous products of furnace 50 are transferred via line 50b to the sulfur dioxide and trioxide absorption tower 36, which is the second gas-liquid absorption tower through which the flocculant concentrate or sludge from thickener is passed. Here in tower 36 the sulfur trioxide is quantitatively absorbed and converts aluminum hydroxide floc to soluble aluminum sulfate. In addition, part of the sulfur dioxide is also absorbed and reacted with aluminum hydroxide to form aluminum sulfite, aluminum hydrogen sulfite, and sulfurous acid.

The gases discharged from sulfur dioxide and trioxide absorption tower 36 contain unabsorbed sulfur dioxide and are transmitted via line 36b to a juncture which extends via line 30b to tower 30, and via line 40c to tower 40. The distribution of gases between lines 30b and 40c is controlled so that the gases vented to the atmosphere from tower 30 contain little or no sulfur dioxide. Thus, that portion of the effluent gases from tower 36 that passes through line 30b is conducted to sulfur dioxide absorption tower 30 where it reacts with the bottoms from thickener 26 to effect substantially complete absorption of sulfur dioxide in the inlet gas stream. This sulfur dioxide reacts with aluminum hydroxide to form aluminum bisulfite as well as some sulfurous acid.

The portion of gases leaving tower 36 that pass through line 40c to sulfur dioxide absorption and oxidation tower 40 is admitted to the bottom of this tower along with air, furnished via line 40d. In tower 40 the sulfur dioxide is absorbed in the descending liquid stream to form sulfurous acid and then aluminum sulfite and hydrogen sulfite (sesquioxide), which is oxidized by the molecular oxygen in the air admitted via line 40d to aluminum sulfate, a soluble material. Under the conditions existing in tower 40, that is, a temperature ranging from about 20° C. to about 80° C. and the presence of aluminum ions, substantial oxidation of hydrogen sulfite, or bisulfite, with molecular oxygen to the sulfate is accomplished, and as a result substantially complete utilization of the sulfur as sulfur trioxide is accomplished.

Effluent gases from tower 40 are conducted via line 40b as recycle to furnace 50, where they are combined with the incoming air and with molten sulfur for conversion to sulfur oxides.

The liquid stream leaving sulfur dioxide absorption and oxidation tower 40 is now composed of an aqueous slurry containing waste solids and dissolved aluminum sulfate. This slurry is passed via line 40a to filter 46, where the organic solids are separated for burning in furnace 50. Furnace 50, as will be appreciated, may actually comprise two or more zones, in one of which sulfur is burned with air to form sulfur oxides; in another of which the organic materials separated from filter 46 are burned with air under oxidizing conditions to destroy the organic materials, and in the third the organic materials from filter 46 may be dried by direct or indirect contact with a hot gas from either or both of the first two zones.

Ash obtained from furnace 50 by oxidizing the organic materials separated from filter 46 and introduced via line 46a may be withdrawn from furnace 50 via line 50a. This ash is composed chiefly of inorganic constituents in the waste liquor and their oxidation products, together with occluded aluminum sulfate which remains with the solid materials. A major portion of the ash may be discarded via line 48b to a suitable dump, while a minor portion, that is less than half and generally less than about 10 or 20 percent may be conducted via line 56b to mixer 56.

Meanwhile, the filtrate from filter 46 is conducted via line 46b to the mixer 56. This filtrate is an aqueous solution of aluminum sulfate which has been separated from the liquid of line 40a and which is suitable for recycle to mixer 10 to serve as flocculating agent. It may be desirable to mix a portion of the ashes from furnace 50 with this filtrate, as described previously, in order to partially neutralize some of the excess acidity in the filtrate. This procedure however is optional.

The effluent from mixer 56 is then transferred via line 56a to storage tank 60, where it is available for re-introduction to mixer 10.

Although in the above example the flocculating agent is aluminum sulfate, it is frequently desirable to use iron sulfate (advantageously ferric ion) as the agent, either alone or in admixture with aluminum sulfate. Iron rather than aluminum offers economies of raw materials cost in some instances and also apparently produces a somewhat heavier floc for more rapid settling in settling basin 20. Makeup iron and/or aluminum may be added either in the form of the hydroxide or the sulfate via line 36c to tower 36, as shown in the drawing, or may be introduced elsewhere as required or desired.

In addition, iron also appears to offer somewhat accelerated oxidation of sulfites and bisulfites to sulfates, at least as compared to aluminum. For this reason it is often desired to use either iron alone, or aluminum containing some iron, as the flocculating cation constituent. Further, in the event it is found that such oxidation is slower than is desired for a particular installation and service, either a separate oxidizing vessel (in which molecular oxygen is bubbled through a tank of a sulfite or bisulfite containing stream located anywhere in the process), or the inclusion of a catalyst such as a trace of bromide ion may be used.

Another optional step, not shown in the drawing, is the extraction of some or all of the ash leaving furnace 50 via line 50a for additional recovery of iron or aluminum sulfate. This extraction may be conducted either with water alone or, optimally, with water containing some sulfurous acid to dissolve some of the burned iron or aluminum in the ash. This procedure offers further enhanced economies in that it minimizes the amount of makeup iron or aluminum hydroxide or slufate added to the system. Thus it has been shown that the method of the invention is effective, economical, and highly advantageous, not only with respect to its localized treatment and recycle of the flocculating agent but in the manner in which it facilitates disposing of the suspended solids by concentration and oxidation. An additional benefit is that the mehtod of the invention permits higher concentrations of flocculating agent to be used in the waste liquor treating process for enhancing separation of suspended solids, with the result that effluent 20a contains less of such solids than would otherwise exist. As a result less chlorine is necessary for the final treatment of the effluent.

While the invention has been described in conjunction with a specific embodiment thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

I claim as my invention:

1. In a process for the treatment of industrial and domestic waste liquors containing suspended solids wherein said solids are separated from said waste liquors by introducing into a waste liquor a flocculating agent selected from the group consisting of sulfates of iron and aluminum under alkaline to neutral conditions effective to convert the flocculating agent to its hydroxide and thereby form a flocculant concentrate containing the hydroxide of said flocculating agent and the originally suspended solids, the improved method of recovering and recycling said flocculating agent and of disposing of said suspended solids which comprises: contacting said concentrate with at least one sulfur oxide gas in an amount sufficient to convert the hydroxide of said flocculating agent to a member of the group consisting of sulfates, sulfites, and bisulfites and with oxygen in an amount sufficient to convert said sulfites and bisulfites to sulfates to thereby redissolve said flocculating agent; separating the resulting soluble flocculating agent from the suspended waste solids in said flocculant concentrate; cycling said flocculating agent to said waste liquor treatment process and disposing of said waste solids.

2. Process of claim 1 wherein said waste solids are disposed of by burning said suspended solids under oxidizing conditions.

3. Process of claim 1 wherein said flocculating agent is ferric sulfate.

4. Process of claim 1 wherein said flocculating agent is aluminum sulfate.

5. Process of claim 1 wherein said flocculating agent is employed in combination with lime.

6. Process of claim 1 wherein said concentrate is contacted with said sulfur oxide gas in a plurality of gas-liquid absorption towers.

7. Process of claim 6 wherein said concentrate is contacted with sulfur dioxide in a first gas-liquid absorption tower and with a mixture of sulfur dioxide and sulfur trioxide in at least one additional gas-liquid absorption tower.

8. Process of claim 7 wherein said concentrate is contacted with a mixture of sulfur dioxide and oxygen gas in at least one additional gas-liquid absorption tower.

References Cited by the Examiner
UNITED STATES PATENTS

| 653,745 | 7/1900 | Jewell | 23—126 |
|---|---|---|---|
| 2,495,120 | 1/1950 | Miller et al. | 23—123 |

MORRIS O. WOLK, *Primary Examiner.*

M. E. ROGERS, *Assistant Examiner.*